United States Patent [19]

Brochard et al.

[11] 3,812,764

[45] May 28, 1974

[54] DRIVING SYSTEM OF THE SPINDLE OF A MILLING LATHE

[75] Inventors: Claude Brochard, Dunkerque; Rene Cossart, Coudekerque-Branche, both of France

[73] Assignee: Creusot-Loire, Paris, France

[22] Filed: May 7, 1973

[21] Appl. No.: 357,829

Related U.S. Application Data

[63] Continuation-in-part of Ser. No. 113,829, Feb. 9, 1972, abandoned.

[30] Foreign Application Priority Data

Feb. 11, 1970 France .............................. 70.04748

[52] U.S. Cl.................. 90/11 R, 90/16, 90/DIG. 1, 82/20
[51] Int. Cl............................ B23b 3/22, B23c 3/00
[58] Field of Search............. 90/63, 95, 11 R, 11 B, 90/16, 18, DIG. 11, DIG. 1; 82/20; 408/46, 126

[56] References Cited

UNITED STATES PATENTS 3,038,361   6/1962   Holzer .............................. 82/20 X
3,112,663   12/1963  Baird ..................................... 82/20

Primary Examiner—Gil Weidenfeld
Attorney, Agent, or Firm—Cameron, Kerkam, Sutton, Stowell & Stowell

[57] ABSTRACT

One or more hollow spindles of a milling lathe are driven by tangent wheel and worm reduction gears at different speeds with the worms aligned; connected; and rotated by a single motor. The spindles are selectively moved to a working position by a jack, which moves the entire assembly, to bring the selected hollow spindle into position to receive the bar to be milled. Each spindle mounts a tool support plate which in turn carries cutters to mill the bar as it passes through the support plate.

2 Claims, 3 Drawing Figures

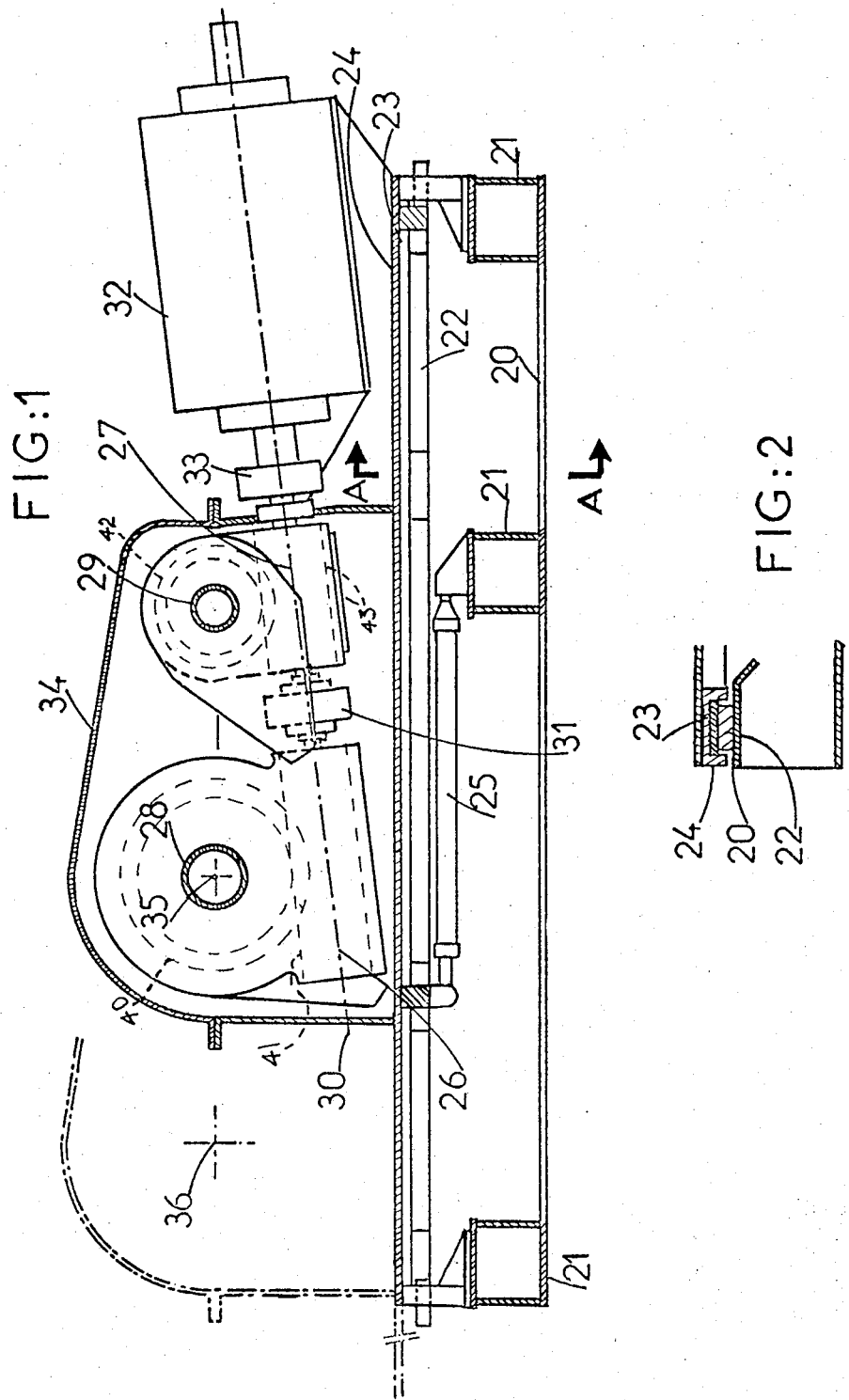

DRIVING SYSTEM OF THE SPINDLE OF A MILLING LATHE

REFERENCE TO A RELATED APPLICATION

This application is a continuation-in-part of our application Ser. No. 113,829, filed Feb. 9, 1972, now abandoned.

BACKGROUND OF THE INVENTION

The present invention relates to a new type of lathe for milling round bars. It is known that a milling lathe comprises the following items:
- a line feeding the bars and provided with guiding rollers;
- a system for moving the bar forward at the entry of the lathe;
- a spindle, formed by a hollow shaft which supports the tool holding plate;
- a system guiding the bar from the lathe; and
- a discharge line for the bars.

The present invention provides an improved milling lathe of improved regularity of operation, a more regular rotation of the spindles and reduced power consumption as compared to known milling lathes. The object of the present invention is to mill round bars with very improved precision and economy.

SUMMARY OF THE INVENTION

Therefore, the object of the present invention is to provide a milling lathe for round bars, in which the tangent wheel of a worm reduction gear is directly keyed to a hollow shaft which forms a spindle and supports the tool holding plate which in turn supports the cutters, the bar feeding through the spindle and plate for engagement by the cutters.

According to an embodiment of the invention, two or more milling systems are mounted in one movable device, for movement to two or more predetermined positions. These systems may be mounted under one protective housing with at least two hollow shafts each forming a hollow spindle, preferably of different diameters. Each spindle is rotated by a tangent wheel which is directly keyed to its shaft. The worms which drive each of the tangent wheels are aligned and driven by a single driving motor. The tangent wheels are of different diameters to provide different milling speeds.

The invention provides for rotation of the spindles without play with rotation of the tool holder plates without play, vibrations from play being detrimental to holding of the cutters on the holding plates. The present invention eliminates vibration by using a tangent wheel directly keyed to the hollow shaft forming a hollow spindle supporting the holding plate and cutters with the tangent wheel driven by a worm which is directly driven by a motor. Known devices commonly used for control of the spindle of milling lathes include gearing, gear-boxes, chains and the like. The present invention provides a much improved support for the cutting tools or cutters.

Furthermore, different cutting speeds are obtained by the juxtaposition of two or more hollow shafts of different diameters rotated by tangent wheels of different diameters with each shaft movable to position to receive the bar which passes therethrough to the associated cutters.

BRIEF DESCRIPTION OF THE DRAWINGS

To illustrate the present invention, a description follows of a preferred embodiment thereof including the above-mentioned improvements, as shown in the accompanying drawings in which:

FIG. 1 is a longitudinal section of a milling lathe of the present invention having two hollow spindles of different diameters;

FIG. 2 is a sectional view on the line A-A of FIG. 1 showing in section the bed for the lathe.

DESCRIPTION OF THE PREFERRED EMBODIMENT

Figure 3:
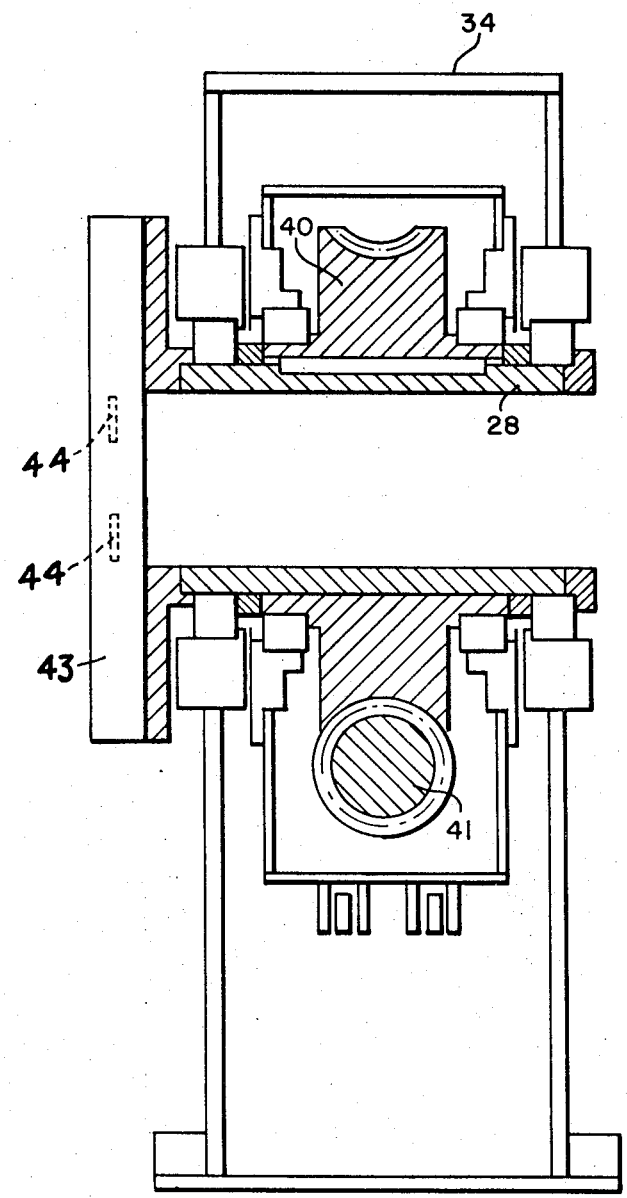
FIG. 3 is a partial cross-sectional view of a spindle, drive gear, drive screw, tool support plate and cutters.

The driving means for the two spindles can be displaced between two accurately located positions, moving either one or the other spindle into position to receive the bar which passes through that spindle to its cutters.

FIG. 2 shows how the lathe slides on its bed. In this figure, a fixed metallic bed 20, provided with reinforcements 21, includes a bed-plate 22 provided with an anti-friction surface 23 on which a movable carrier 24 slides. Carrier 24 supports the driving device for the two spindles. The movable carrier 24 and the driving device which it supports are moved by a jack 25 to occupy two predetermined different positions. The first position is shown in solid line in FIG. 1 with the larger diameter spindle in position to receive the bar. The second position is shown in hatched line at the left side of FIG. 1 and in this position the smaller diameter spindle is in position to receive the bar.

The lathe has two worm reduction gears 26 and 27 each driving a tangent wheel. The two tangent wheels 40 and 42 are of different diameters to provide different cutter speeds for a single speed of the worms and are respectively keyed directly onto hollow shaft or spindle 28 and hollow shaft or spindle 29. The worms of the reduction gears 26 and 27, worm 41 of gear 26 also being shown in FIG. 3, are accurately located in axis 30; are connected by a coupler 31; and are connected to driving motor 32 by coupler 33. Coupler 31 can be of usual type or it can be a clutch or it can be a selective coupler if only one of the spindles is to be rotated.

The two reduction gears 26 and 27 are located in a housing 34 mounted on movable carrier 24. The mounts for motor 32, not shown, are secured to movable carrier 24.

The axis of feed of the bars, referred to herein as the milling axis, is shown at 35 in FIG. 1. In this figure, the bigger of the two reduction gears 26, and the spindle 28 having the larger diameter are at the work position in the milling axis, the work piece moving through spindle 28 and through the associated tool support plate and cutters.

If spindle 29 of a smaller diameter and different cutting speed is to be used, jack 25 is actuated and the lathe is moved horizontally so that spindle 29 is accurately centered in milling axis 35, and the center of spindle 28 is moved to position 36. The distance between points 36 and 36 represents the travel of the lathe.

Tangent wheel 40 (FIG. 3) of reducing gear 26, has a larger diameter than gear 42 of reducing gear 27 to provide different cutting speeds. The displacement mentioned above is horizontal and the axis 30 of the worm and of motor 32 are slightly inclined to the horizontal.

FIG. 3 shows in cross-section shaft 28, gear 40, worm 41, tool support plate 43 secured to shaft 28 and cutters 44 mounted in plate 43. The bar to be milled passes through shaft or spindle 28 and through plate 43 into cutters 44 which are rotated with plate 43 to mill the bar. Known means (not shown) feed the bar into and through the cutters. After milling by one of the two spindles of the above-described device, the milled bar is guided by rollers (not shown) from the lathe and removed by known conveyor means (not shown).

Changes in or modifications to the above-described illustrative embodiment of the present invention may be made within the scope of the invention, and equivalent means may be employed without departing from the present inventive concept. For example, the lathe may include more than two spindles.

We claim:

1. In a milling lathe for milling round bars which are moved along a milling axis at a work position, said lathe comprising a fixed base, at least two hollow shafts parallel to the axis of the lathe, the bar to be milled passing through one of said shafts at the work position, a tool support plate fixed to each of said shafts, milling tools mounted on said plate to mill the bar passing through said shaft, worm gear means for rotating said shafts, said milling tools rotating around the milling axis, a sliding base mounted on said fixed base for movement transverse to the milling axis of the lathe and supporting said shafts and said means for rotating said shafts, and means for positioning said sliding base in at least two positions to selectively bring each of said shafts to the work position and coaxial with the milling axis.

2. A milling lathe as described in claim 1, said worm gear means for rotating said shafts including for each of said shafts a tangent wheel secured on said shaft and a worm gear for driving said tangent wheel, said worm gears being aligned, means for selectively coupling said worm gears together and a motor for rotating said worm gears.

* * * * *